United States Patent
Chiang

(10) Patent No.: US 9,613,252 B1
(45) Date of Patent: Apr. 4, 2017

(54) FINGERPRINT MATCHING METHOD AND DEVICE

(71) Applicant: Egis Technology Inc., Taipei (TW)

(72) Inventor: Yuan-Lin Chiang, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 14/810,373

(22) Filed: Jul. 27, 2015

Related U.S. Application Data

(60) Provisional application No. 62/063,338, filed on Oct. 13, 2014.

(51) Int. Cl.
  *G06K 9/46* (2006.01)
  *G06K 9/00* (2006.01)
(52) U.S. Cl.
  CPC ........ *G06K 9/00087* (2013.01); *G06K 9/0002* (2013.01); *G06K 9/00926* (2013.01)
(58) Field of Classification Search
  CPC ........... G06K 9/00087; G06K 9/00926; G06K 9/0002; G06K 9/00026; G06K 9/00013; G06K 9/00067

USPC ....... 382/100, 124, 125, 126, 118, 168, 173, 382/181, 190, 195, 206, 209, 291, 294
See application file for complete search history.

(56) References Cited

U.S. PATENT DOCUMENTS

| | | | | |
|---|---|---|---|---|
| 7,236,617 B1 * | 6/2007 | Yau | ..................... | G06K 9/00026 382/125 |
| 7,616,787 B2 * | 11/2009 | Boshra | ............... | G06K 9/00026 382/124 |
| 7,840,034 B2 * | 11/2010 | Takahashi | ............... | G06F 21/32 382/115 |
| 8,320,997 B2 * | 11/2012 | Abe | ....................... | A61B 5/117 382/115 |
| 2009/0046904 A1 * | 2/2009 | Moon | ..................... | G06K 9/52 382/124 |

* cited by examiner

*Primary Examiner* — Sheela C Chawan

(57) ABSTRACT

A fingerprint matching method and device are provided. The fingerprint matching method includes the step of capturing a plurality of registered templates, capturing a to-be-recognized data, comparing the to-be-recognized data and the plurality of registered templates, generating a plurality of comparison scores corresponding to the registered templates which overlap the to-be-recognized data, generating a comparison result according to the plurality of comparison scores, and determining whether the to-be-recognized data is verified according to the comparison result.

18 Claims, 6 Drawing Sheets

FINGERPRINT MATCHING METHOD AND DEVICE

CROSS REFERENCE TO RELATED APPLICATIONS

This Application claims priority of Provisional Patent Application No. 62/063,338 filed on Oct. 13, 2014, the entirety of which is incorporated by reference herein.

BACKGROUND OF THE INVENTION

Field of the Invention

The invention generally relates to fingerprint recognition technology, and more particularly to fingerprint recognition technology for generating a comparison result according to a plurality of comparison scores which are generated by comparing the to-be-recognized data with the plurality of registered templates.

Description of the Related Art

In recent years, biometric recognition technology has developed greatly. Since security codes and access cards may easily be stolen or lost, more attention has been paid to fingerprint-recognition technology. Fingerprints are unique and never-changing, and each person has multiple fingers for identity recognition. In addition, fingerprints can be obtained easily using fingerprint sensors. Therefore, fingerprint recognition can provide increased security and convenience, and financial security and confidential data can be better protected.

With conventional fingerprint recognition technology, when a verification fingerprint (to-be-recognized data) is compared with a plurality of registered templates, the fingerprint matching device only selects the highest comparison score from the comparison scores for fingerprint recognition. In addition, with a fingerprint matching device with a small sensing area, the captured fingerprint data which is sensed by the fingerprint matching device comprises few minutiae. Therefore, when the selected comparison score is approximate to the threshold, the fingerprint matching device with a small sensing area may generate a wrong fingerprint-matching result. For example, when an intrusion finger (inadmissible finger) is put on the fingerprint matching device for fingerprint recognition and then the comparison score is a bit higher than the threshold, the fingerprint matching device may determine the intrusion finger is verified and the false acceptance will occur.

BRIEF SUMMARY OF THE INVENTION

A fingerprint matching method and device are provided to utilize the comparison scores between the to-be-recognized data and a plurality of registered templates to verify the to-be-recognized data.

An embodiment of the invention provides a fingerprint matching method. The fingerprint matching method includes the step of capturing a plurality of registered templates, capturing a to-be-recognized data, comparing the to-be-recognized data and the plurality of registered templates, generating a plurality of comparison scores corresponding to the registered templates which overlap the to-be-recognized data, generating a comparison result according to the plurality of comparison scores, and determining whether the to-be-recognized data is verified according to the comparison result.

An embodiment of the invention provides a fingerprint matching device. The fingerprint matching device includes a fingerprint matching device and a processing unit. The fingerprint sensor is configured to capture a plurality of registered templates and a to-be-recognized data. The processing unit is configured to compare the to-be-recognized data and the plurality of registered templates to generate a plurality of comparison scores corresponding to the registered templates which overlap the to-be-recognized data. The processing unit is further configured to generate a comparison result according to the plurality of comparison scores and determine whether the to-be-recognized data is verified according to the comparison result.

Other aspects and features of the invention will become apparent to those with ordinary skill in the art upon review of the following descriptions of specific embodiments of methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
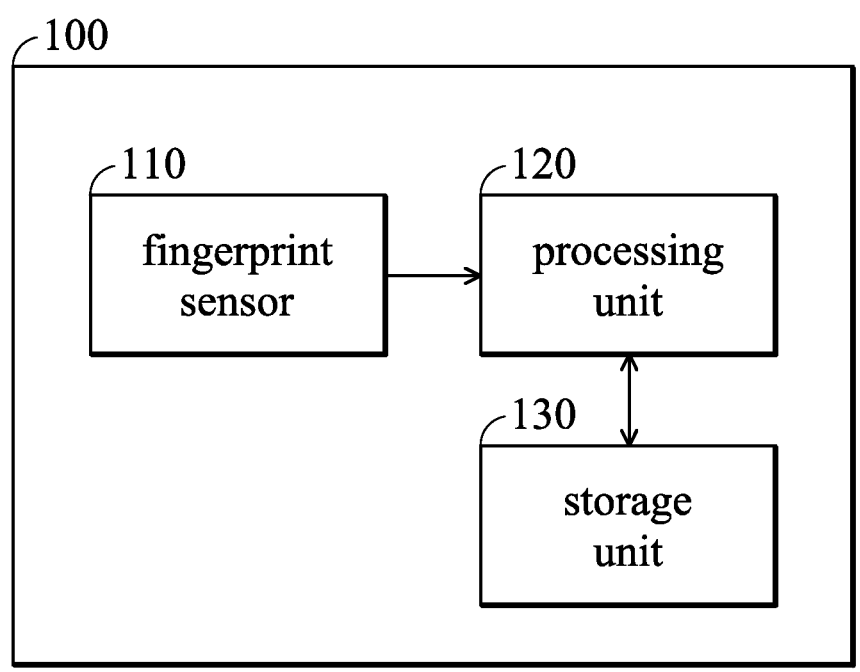
FIG. 1 is a block diagram of a fingerprint matching device 100 according to an embodiment of the invention.

FIG. 1 is a block diagram of a fingerprint matching device 100 according to an embodiment of the invention. As shown in FIG. 1, the fingerprint matching device 100 comprises a fingerprint sensor 110, a processing unit 120 and a storage unit 130. FIG. 1 presents a simplified block diagram in which only the elements relevant to the invention are shown. However, the invention should not be limited to what is shown in FIG. 1.

In an embodiment of the invention, the fingerprint sensor 110 is a swipe sensor, a press sensor or a sensor which can support the functions of the swipe sensor and the press sensor at the same time. Namely, the user can press his or her finger on the fingerprint sensor 110 of the fingerprint matching device 100 and/or swipe his or her finger over the fingerprint sensor 110 of the fingerprint matching device 100 to generate the fingerprint data.

In an embodiment of the invention, for fingerprint registration, the user may press several times his or her finger on the fingerprint sensor 110 of the fingerprint matching device 100 or swipe several times his or her finger over the fingerprint sensor 110 of the fingerprint matching device 100 in order to generate a plurality of registered templates. In an embodiment of the invention, after the processing unit 120 obtains the registered templates, it will store the registered templates to the storage unit 130. In an embodiment of the invention, if the registered templates are generated by swiping one's finger over the fingerprint sensor 110 of the fingerprint matching device 100, the processing unit 120 will select a plurality of effective frames from the frames captured by the fingerprint sensor 110 for each swiping first, and then the selected effective frames will form the registered templates.

After the registered templates are generated, when the user presses his or her finger on the fingerprint sensor 110, or swipes his or her finger over the fingerprint sensor 110 again, the fingerprint sensor 110 will capture a fingerprint data (the to-be-recognized data hereinafter). After the to-be-recognized data is generated, the processing unit 120 will compare the to-be-recognized data with the plurality of registered templates. After the comparison, the processing unit 120 will generate a plurality of comparison scores corresponding to the registered templates which overlap the to-be-recognized data. If none of the registered templates overlaps the to-be-recognized data, no comparison score will be generated. In an embodiment of the invention, the processing unit 120 generates the comparison scores according to the ridge information and/or minutia information.

In an embodiment of the invention, after the processing unit 120 obtains the comparison result, it will determine whether the comparison result is higher than a first threshold. If the comparison result is higher than the first threshold, the processing unit 120 will determine that the to-be-recognized data is verified. If the comparison result is lower than the first threshold, the processing unit 120 will determine that the to-be-recognized data fails the verification. In an embodiment of the invention, the first threshold can be adjusted for different fingerprint matching devices.

Figure 2:
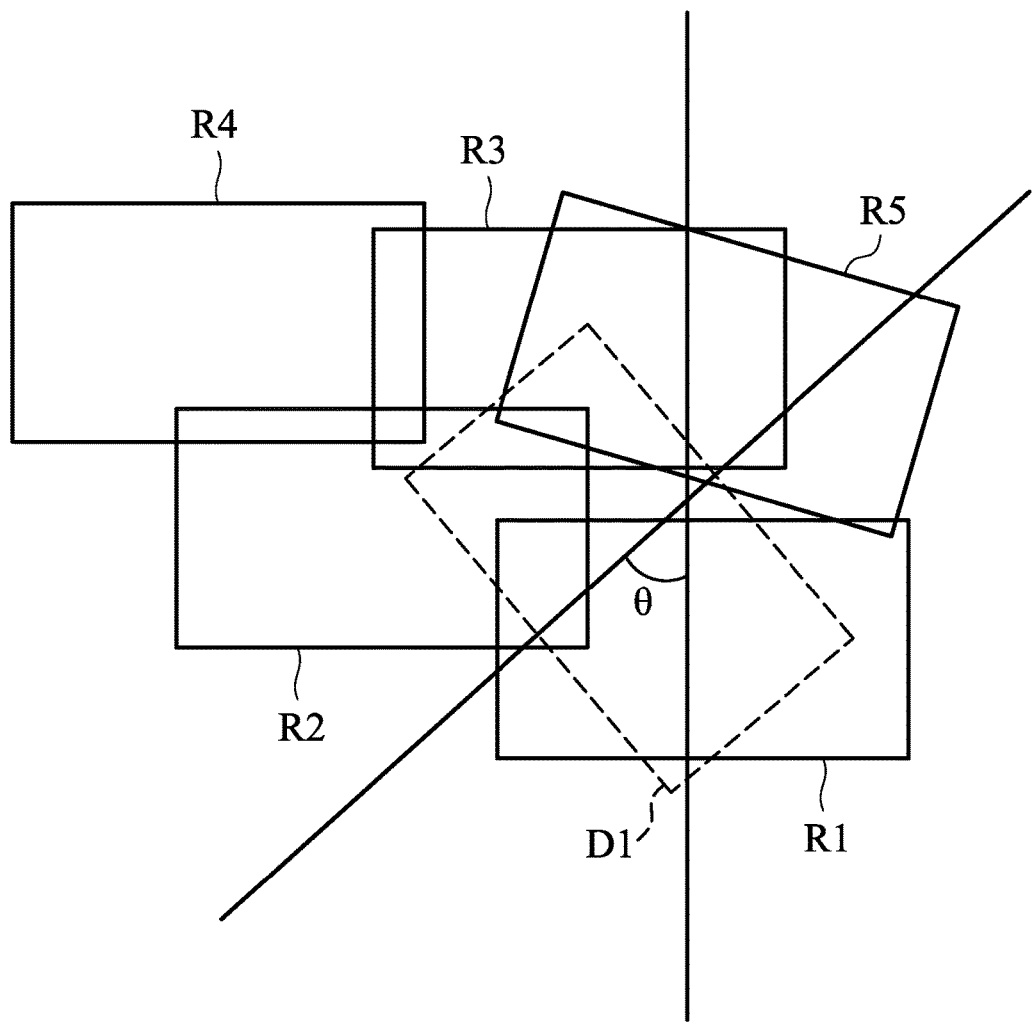
FIG. 2 is a schematic diagram illustrating the to-be-recognized data which is compared with the registered templates according to an embodiment of the invention.

FIG. 2 is a schematic diagram illustrating the comparison of the to-be-recognized data which is compared with the registered templates according to an embodiment of the invention. The to-be-recognized data D1 and the registered templates R1~R5 are shown in FIG. 2. As shown in FIG. 2, after the to-be-recognized data D1 is compared with the registered templates R1~R5, the comparison scores for the registered templates R1~R3 and R5 which overlap the to-be-recognized data D1 are generated. No comparison score will be generated for the registered template R4 because it does not overlap the to-be-recognized data D1. Note that the to-be-recognized data D1 and the registered templates R1~R5 correspond to different areas of the user's fingerprint. Part of the overlapped area between the to-be-recognized data D1 and the registered template R1 may also appear in the registered template R2. Part of the overlapped area between the to-be-recognized data D1 and the registered template R2 may also appear in the registered template R3. Therefore, the comparison scores corresponding to the registered templates R1~R3 and R5 are generated respectively according to the overlapped areas between the to-be-recognized data D1 and the registered templates R1~R3 and R5. In addition, FIG. 2 is only an illustration of the embodiments of the invention, but the invention should not be limited to what is shown in FIG. 2. In addition, the fingerprint data of FIG. 2 is generated by pressing one's finger on the fingerprint sensor 110, but the invention should not be limited thereto. The fingerprint data may be generated by swiping one's finger over the fingerprint sensor 110.

In an embodiment of the invention, after the processing unit 120 obtains the comparison scores, it will select the registered template which corresponds to the highest comparison score. Taking FIG. 2 for example, if the comparison scores between the to-be-recognized data D1 and the registered templates R1~R3 and R5 are 50, 15, −5, −8 respectively. The processing unit will select the registered template R1 first and then record the comparison score of the registered template R1. In an embodiment of the invention, if the highest comparison score is lower than a second threshold (e.g. one third of the first threshold), the processing unit 120 will determine that the to-be-recognized data D1 fails the verification.

In an embodiment of the invention, after the processing unit 120 selects the registered template which corresponds to the highest comparison score, it will generate angle information according to the rotation between the to-be-recognized data and the registered template which corresponds to the highest comparison score. As shown in FIG. 2, the rotation between the to-be-recognized data D1 and the registered template R1 which corresponds to the highest comparison score is $\theta$ (angle information). If the rotation between the to-be-recognized data D1 and another registered template is not equal or approximate to $\theta$, the processing unit 120 will not calculate the comparison score for registered template, since this registered template does not satisfy the angle information. For example, in FIG. 2, the rotation between the to-be-recognized data D1 and registered template R5 is not $\theta$, and therefore the registered template R5 does not satisfy the angle information. In the following processes, the processing unit 120 will not calculate the comparison score for the registered template R5.

In an embodiment of the invention, the processing unit 120 may generate a comparison result according to the comparison scores corresponding to the registered templates (including the registered template which corresponds to the highest comparison score) which satisfy the angle information. In an embodiment of the invention, the processing unit 120 generates the comparison result by summing up the comparison scores corresponding to the registered template which satisfy the angle information. However, the invention should not be limited thereto. The processing unit 120 can also generate the comparison result by other suitable algorithms.

In an embodiment of the invention, after the processing unit 120 selects the registered templates according to the angle information, it may remove a first overlapped area between the to-be-recognized data and the registered template which corresponds to the highest comparison score from the to-be-recognized data. After the processing unit 120 removes the first overlapped area from the to-be-recognized data, it will re-determine the overlapped areas between the remaining area of the to-be-recognized data and other registered templates which satisfy the angle information. As shown in FIG. 2, if the registered template R1 corresponds to the highest comparison score, the processing unit 120 will remove the first overlapped area between the to-be-recognized data D1 and the registered template R1. Part of the overlapped area between the to-be-recognized data D1 and the registered template R1 may also appear in the registered template R2. Therefore, after the processing unit 120 removes the first overlapped area, the overlapped area between the to-be-recognized data D1 and the registered template R2 will vary. Therefore, after the processing unit 120 removes the first overlapped area, it will re-determine the overlapped areas between the remaining area of the to-be-recognized data D1 and registered templates R2 and R3. The registered template R5 does not satisfy the angle information, and therefore the registered template R5 will not be concerned.

In an embodiment of the invention, after the processing unit 120 determines the overlapped areas between the remaining area of the to-be-recognized data (where the first overlapped area is removed) and other registered templates which satisfy the angle information, it will select the registered template which has the largest overlapped area (i.e. a second overlapped area) in the remaining area of the to-be-recognized data (where the first overlapped area is removed) and then record the comparison score corresponding to the selected registered template. Then, the processing unit 120 will remove the second overlapped area from the remaining area of the to-be-recognized data. After the processing unit 120 re-determines the overlapped areas between the remaining area of the to-be-recognized data and other (where the first overlapped area and the second overlapped area are removed) registered templates which satisfy the angle information, it will select the registered template which has the largest overlapped area (i.e. a third overlapped area) in the remaining area of the to-be-recognized data and then record the comparison score corresponding to the selected registered template accordingly. The processing unit 120 will not generate the comparison result according to the comparison scores corresponding to the selected registered templates until all registered templates which overlap the to-be-recognized data and satisfy the angle information are selected.

Back to FIG. 2, for example, after the processing unit 120 determines the overlapped areas between the remaining area of the to-be-recognized data D1 (i.e. the first overlapped area between the to-be-recognized data D1 and the registered template R1 is removed from the to-be-recognized data D1) and the registered templates R2 and R3, the processing unit 120 will select the registered template which has the largest overlapped area in the remaining area of the to-be-recognized data and then record the comparison score corresponding to the selected registered template. If the registered template R3 has the largest overlapped area (i.e. a second overlapped area) in the remaining area of to-be-recognized data D1, the processing unit 120 will remove the second overlapped area from the remaining area of the to-be-recognized data D1 and re-determine the overlapped area between the remaining area of the to-be-recognized data D1 (where the first overlapped area and the second overlapped area are removed) and the registered template R2 and the comparison scores corresponding to the registered template R2. The processing unit 120 will generate the comparison result according to the comparison scores corresponding to the selected registered templates R1~R3 after the processing unit 120 selects the registered templates R1~R3 which overlap the to-be-recognized data D1 and satisfy the angle information.

Note that, in the embodiment of the invention, the processing unit 120 can also select only one specific number of registered templates which overlap the to-be-recognized data D1 and satisfy the angle information and generate the comparison result according to the comparison scores corresponding to the selected registered templates. For example, in the above embodiment, the processing unit 120 can select merely two registered templates, i.e. registered templates R1 and R3, and generate the comparison result according to the comparison scores corresponding to the registered templates R1 and R3.

In an embodiment of the invention, after the processing unit 120 determines the overlapped areas and re-calculate the comparison scores between the remaining area of the to-be-recognized data (where the first overlapped area is removed) and other registered templates which satisfy the angle information, the processing unit 120 will select a second registered template which has the highest comparison score from other registered templates and then record the comparison score of the second registered template. Then the processing unit 120 will remove the second overlapped area between the second registered template and the remaining area of the to-be-recognized data. After the processing unit 120 removes the second overlapped area, it will determine the overlapped areas and re-calculate the comparison scores between the remaining area of the to-be-recognized data (where the first overlapped area and the second overlapped area are removed) and the remaining registered templates which satisfy the angle information, and select a third registered template t which has the highest comparison score from the remaining registered templates, and then record the comparison score of the third registered template accordingly. The processing unit 120 will not generate the comparison result according to the comparison scores corresponding to the selected registered templates until all of the registered templates which overlap the to-be-recognized data and satisfy the angle information are selected.

Back to FIG. 2, for example, after the processing unit 120 determines the overlapped areas and re-calculates the comparison scores between the first remaining area of the to-be-recognized data D1 (where the first overlapped area between the registered template R1 and the to-be-recognized data D1 is removed) and the registered templates R2 and R3, the processing unit 120 will select a second registered template which has the highest comparison score and then record the comparison score of the second registered template. If the second registered template is the registered template R2, the processing unit 120 will remove the second overlapped area between the registered template R2 and the first remaining area of the to-be-recognized data D1 from the first remaining area of the to-be-recognized data D1, and then determine the overlapped areas and re-calculate the comparison scores between a second remaining area of the to-be-recognized data (where the first overlapped area and the second overlapped area are removed) and the registered template R3. The processing unit 120 will generate the comparison result according to the comparison scores corresponding to the selected registered templates R1~R3 after all registered templates which overlap the to-be-recognized data and satisfy the angle information are selected.

Note that, in the embodiment of the invention, the processing unit 120 can select only one specific number of registered templates which overlap the to-be-recognized data and satisfy the angle information and generate the comparison result according to the comparison scores corresponding to the selected registered templates. For example, in the above embodiment, the processing unit 120 can select merely two registered templates, i.e. registered templates R1 and R2, and generate the comparison result according to the comparison scores corresponding to the registered templates R1 and R2.

In addition, when a user presses or swipes his or her finger on or over the fingerprint sensor 110, the user may not press or swipe his or her finger on or over the same place of the fingerprint sensor 110 every time. That is to say that the to-be-recognized data and each of the registered template may correspond to different areas of the fingerprint of the user. Therefore, the processing unit 120 needs to know the relative location information, i.e. the rotation and shift, between the to-be-recognized data and registered templates in order to generate the comparison scores. In other words, before calculating the comparison scores between the to-be-recognized data and registered templates, the processing unit 120 has to obtain the relative location information, i.e. rotation and shift, between the to-be-recognized data and registered templates. When the processing unit 120 determines that the to-be-recognized data and one of the registered templates have the same minutia, it will calculate the relative location information, i.e. rotation and shift, between the minutia of the to-be recognized data and the minutia of the registered template.

Take FIG. 2 for example, if the relative location information, i.e. rotation and shift, between the to-be-recognized data D1 and the registered template R3 cannot be generated, the processing unit 120 can obtain the relative location information between the to-be-recognized data D1 and the registered template R3 according to the relative location information between the to-be-recognized data D1 and the registered template R1, the relative location information between the registered template R1 and the registered template R2, and the relative location information between the registered template R2 and the registered template R3. After the processing unit 120 obtains the relative location information between the to-be-recognized data D1 and the registered template R3, it will be able to generate the comparison score between the to-be-recognized data D1 and the registered template R3.

Figure 3:
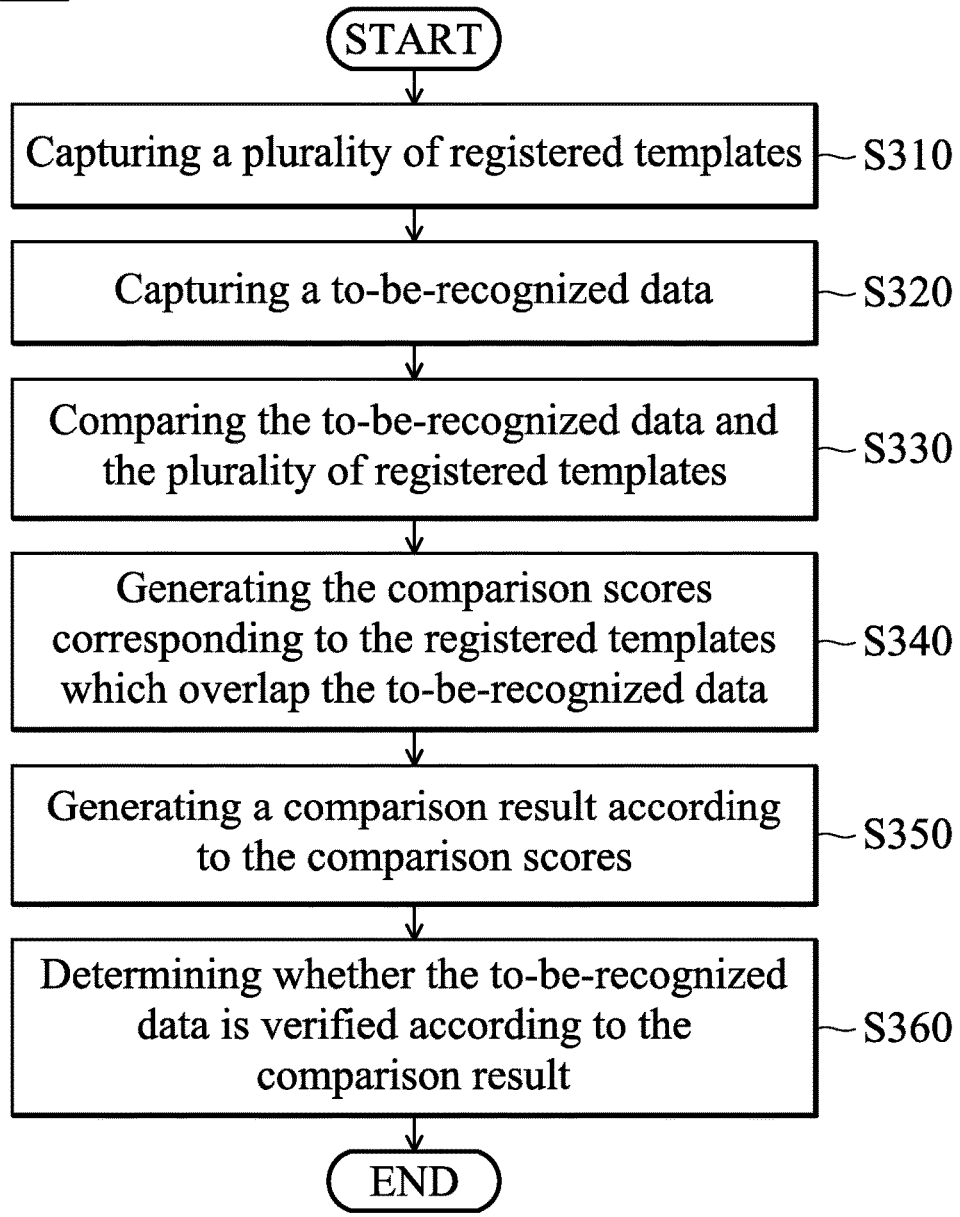
FIG. 3 is a flow chart 300 illustrating the fingerprint matching method according to an embodiment of the invention.

FIG. 3 is a flow chart 300 illustrating the fingerprint matching method according to an embodiment of the invention. The fingerprint matching method is applied to the fingerprint matching device 100. As shown in FIG. 3, in step S310, the fingerprint matching device 100 captures a plurality of registered templates. In step S320, the fingerprint matching device 100 captures a to-be-recognized data. In step S330, the fingerprint matching device 100 compares the to-be-recognized data and the plurality of registered templates. In step S340, the fingerprint matching device 100 generates the comparison scores corresponding to the registered templates which overlap the to-be-recognized data. In step S350, the fingerprint matching device 100 generates a comparison result according to the comparison scores. In step S360, the fingerprint matching device 100 determines whether the to-be-recognized data is verified according to the comparison result.

In an embodiment of the invention, the fingerprint matching device 100 determines whether the to-be-recognized data is verified by determining whether the comparison result is higher than a first threshold. If the comparison result is higher than the first threshold, the fingerprint matching device 100 will determine the to-be-recognized data is verified. If the comparison result is lower than the first threshold, the fingerprint matching device 100 will determine the to-be-recognized data fails the verification.

Figure 4:
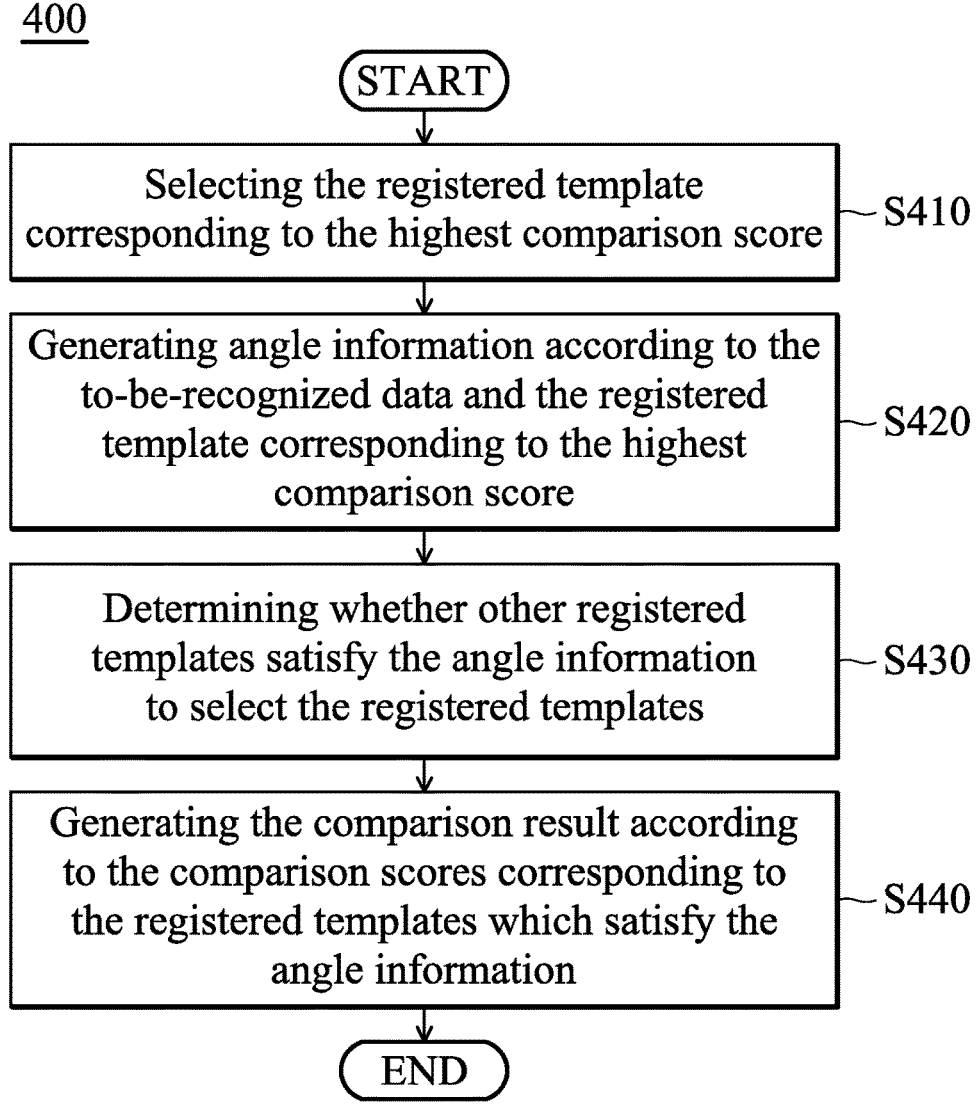
FIG. 4 is a flow chart 400 illustrating the fingerprint matching method according to another embodiment of the invention.

FIG. 4 is a flow chart 400 illustrating the fingerprint matching method according to another embodiment of the invention. The fingerprint matching method is applied to the fingerprint matching device 100. As shown in FIG. 4, in step S410, the fingerprint matching device 100 selects the registered template corresponding to the highest comparison score. In step S420, the fingerprint matching device 100 generates angle information according to the to-be-recognized data and the registered template corresponding to the highest comparison score. In step S430, the fingerprint matching device 100 determine whether other registered templates satisfy the angle information to select the registered templates. In step S440, the fingerprint matching device 100 generate the comparison result according to the comparison scores corresponding to the registered templates which satisfy the angle information (including the registered template corresponding to the highest comparison score).

Figure 5:
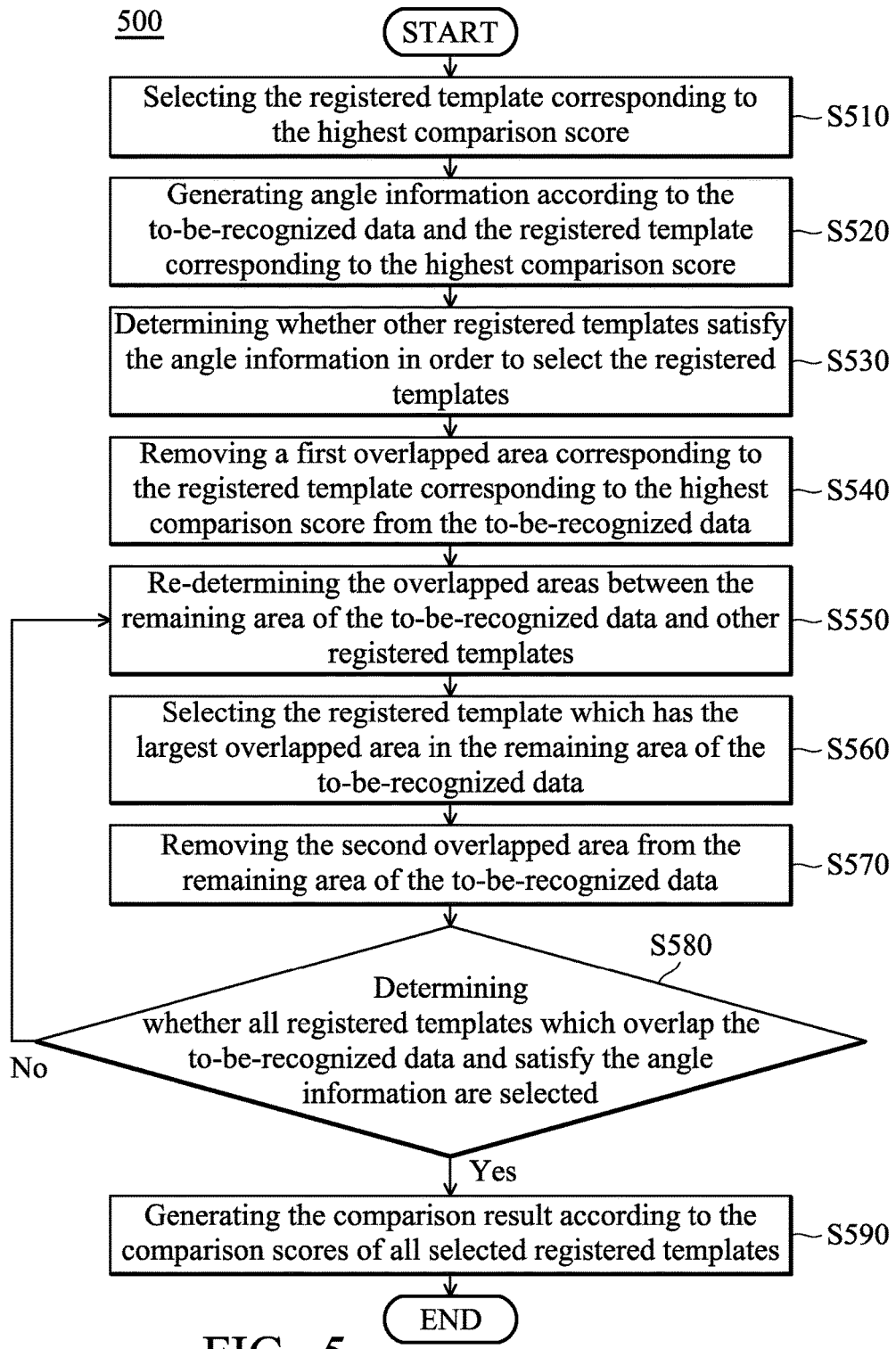
FIG. 5 is a flow chart 500 illustrating the fingerprint matching method according to another embodiment of the invention.

FIG. 5 is a flow chart 500 illustrating the fingerprint matching method according to another embodiment of the invention. The fingerprint matching method is applied to the fingerprint matching device 100. As shown in FIG. 5, in step S510, the fingerprint matching device 100 selects the registered template corresponding to the highest comparison score. In step S520, the fingerprint matching device 100 generates angle information according to the to-be-recognized data and the registered template corresponding to the highest comparison score. In step S530, the fingerprint matching device 100 determines whether other registered templates satisfy the angle information in order to select the registered templates. In step S540, the fingerprint matching device 100 removes a first overlapped area corresponding to the registered template corresponding to the highest comparison score from the to-be-recognized data. In step S550, the fingerprint matching device 100 re-determines the overlapped areas between the remaining area of the to-be-recognized data and other registered templates. In step S560, the fingerprint matching device 100 selects the registered template which has the largest overlapped area (i.e. a second overlapped area) in the remaining area (where the first overlapped area is removed) of the to-be-recognized data. In step S570, the fingerprint matching device 100 removes the second overlapped area from the remaining area of the to-be-recognized data. In step S580, the fingerprint matching device 100 determines whether all registered templates which overlap the to-be-recognized data and satisfy the angle information are selected. If registered templates which overlap the to-be-recognized data and satisfy the angle information are not all selected, the method returns to step S550. If all the registered templates which overlap the to-be-recognized data and satisfy the angle information are selected, step S590 will be performed. In step S590, the fingerprint matching device 100 generates the comparison result according to the comparison scores of all selected registered templates.

Note that, in the embodiment of the invention, the fingerprint matching device 100 can select only one specific number of registered templates which overlap the to-be-recognized data and satisfy the angle information and generate the comparison result according to the comparison scores corresponding to the selected registered templates.

Figure 6:
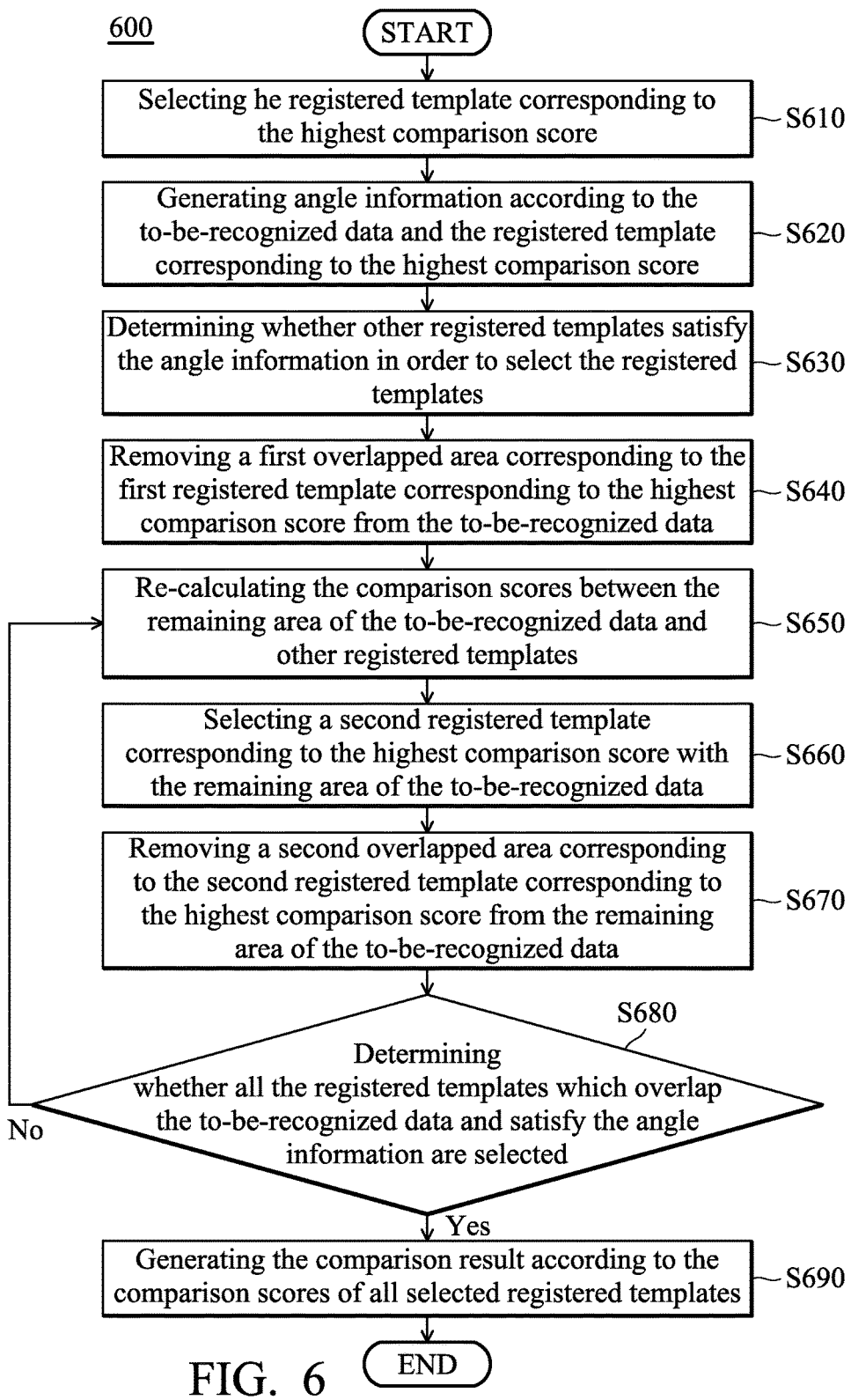
FIG. 6 is a flow chart 600 illustrating the fingerprint matching method according to another embodiment of the invention.

FIG. 6 is a flow chart 600 illustrating the fingerprint matching method according to another embodiment of the invention. The fingerprint matching method is applied to the fingerprint matching device 100. As shown in FIG. 6, in step S610, the fingerprint matching device 100 selects the registered template (i.e. first registered template) corresponding to the highest comparison score. In step S620, the fingerprint matching device 100 generates angle information according to the to-be-recognized data and the registered template corresponding to the highest comparison score. In step S630, the fingerprint matching device 100 determine whether other registered templates satisfy the angle information in order to select the registered templates. In step S640, the fingerprint matching device 100 removes a first overlapped area corresponding to the first registered template corresponding to the highest comparison score from the to-be-recognized data. In step S650, the fingerprint matching device 100 re-calculates the comparison scores between the remaining area (where the first overlapped area is removed) of the to-be-recognized data and other registered templates. In step S660, the fingerprint matching device 100 selects a second registered template corresponding to the highest comparison score with the remaining area of the to-be-recognized data. In step S670, the fingerprint matching device 100 removes a second overlapped area corresponding to the second registered template corresponding to the highest comparison score from the remaining area of the to-be-recognized data. In step S680, the fingerprint matching device 100 determines whether all the registered templates which overlap the to-be-recognized data and satisfy the angle information are selected. If registered templates which overlap the to-be-recognized data and satisfy the angle information are not all selected, the method returns to step S650. If all the registered templates which overlap the to-be-recognized data and satisfy the angle information are selected, step S690 will be performed. In step S690, the fingerprint matching device 100 generates the comparison result according to the comparison scores of all selected registered templates.

Note that, in the embodiment of the invention, the fingerprint matching device 100 can select only one specific number of registered templates which overlap the to-be-recognized data and satisfy the angle information and generate the comparison result according to the comparison scores corresponding to the selected registered templates.

In an embodiment of the invention, if the to-be-recognized data and a first registered template don't have a first relative location information, i.e. the rotation and shift, the fingerprint matching device 100 can obtain the first relative location information between the to-be-recognized data and the first registered template according to a second relative location information between the to-be-recognized data and a second registered template and a third relative location information between the first registered template and the second registered template.

According to the fingerprint recognition method in the embodiments of the invention, the fingerprint matching device can generate the comparison result according to a plurality of comparison scores. Therefore, compared with the conventional fingerprint matching device, which uses only the highest comparison score for determining the fingerprint verification result, the present invention can reduce the occurrence of wrong fingerprint-matching result and false acceptance of fingerprint. When the highest comparison score is approximate to the setting threshold, the fingerprint matching device according to the present invention can further refer to other comparison scores so as to increase the success rate of fingerprint recognition.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fingerprint matching method, comprising:
capturing a plurality of registered templates;
capturing a verification fingerprint data;
comparing the verification fingerprint data and the plurality of registered templates;
generating a plurality of comparison scores corresponding to the registered templates which overlap the verification fingerprint data;
selecting the registered template which corresponds to the highest comparison score;
generating angle information according to the verification fingerprint data and the registered template which corresponds to the highest comparison score;
generating a comparison result according to the plurality of comparison scores and the angle information; and
determining whether the verification fingerprint data is verified according to the comparison result.

2. The fingerprint matching method of claim 1, further comprising:
selecting the registered templates which satisfy the angle information according to the angle information; and
generating the comparison result according to the comparison scores corresponding to the registered templates which satisfy the angle information.

3. The fingerprint matching method of claim 1, further comprising:
selecting the registered templates which satisfy the angle information according to the angle information; and
removing a first overlapped area between the verification fingerprint data and the registered template which corresponds to the highest comparison score.

4. The fingerprint matching method of claim 3, further comprising:
re-calculating the comparison scores after removing the first overlapped area;
selecting the registered template which corresponds to the largest overlapped area in the remaining area of the verification fingerprint data;

removing a second overlapped area between the remaining area of the verification fingerprint data and the registered template which corresponds to the largest overlapped area in the remaining area of the verification fingerprint data;

re-calculating the comparison scores after removing the second overlapped area; and not generating the comparison result according to the comparison scores corresponding to all of the selected registered templates until all of registered templates which overlap the verification fingerprint data are selected.

5. The fingerprint matching method of claim 3, further comprising:

re-calculating the comparison scores after removing the first overlapped area;

selecting the registered template which corresponds to the highest comparison score in the remaining area of the verification fingerprint data;

removing a second overlapped area between the remaining area of the verification fingerprint data and the registered template which corresponds to the highest comparison score in the remaining area of the verification fingerprint data;

re-calculating the comparison scores after removing the second overlapped area; and not generating the comparison result according to the comparison scores corresponding to all of the selected registered templates until all of registered templates which overlap the verification fingerprint data are selected.

6. The fingerprint matching method of claim 1, further comprising:

determining whether the comparison result is higher than a first threshold, wherein the verification fingerprint data is determined to be verified if the comparison result is higher than the first threshold, and wherein the verification fingerprint data is determined to fail the verification if the comparison result is lower than the first threshold.

7. The fingerprint matching method of claim 1, further comprising:

generating the first relative location information according to a second relative location information between the verification fingerprint data and a second registered template and a third relative location information between a first registered template and the second registered template when the verification fingerprint data and the first registered template of the registered templates do not have the first relative location information.

8. The fingerprint matching method of claim 1, wherein the comparison scores are generated according to ridge information and/or minutia information.

9. The fingerprint matching method of claim 1, wherein the verification fingerprint data and registered templates are generated by swiping over or pressing one's finger on a fingerprint matching device.

10. A fingerprint matching device, comprising:

a fingerprint sensor, capturing a plurality of registered templates and a verification fingerprint data; and a processor, comparing the verification fingerprint data and the plurality of registered templates to generate a plurality of comparison scores corresponding to the registered templates which overlap the verification fingerprint data, selecting the registered template which corresponds to the highest comparison score, generating angle information according to the verification fingerprint data and the registered template which corresponds to the highest comparison score, generating a comparison result according to the plurality of comparison scores and the angle information, and determining whether the verification fingerprint data is verified according to the comparison result.

11. The fingerprint matching device of claim 10, wherein the processor further selects the registered templates which satisfy the angle information according to the angle information and generates the comparison result according to the comparison scores corresponding to the registered templates which satisfy the angle information.

12. The fingerprint matching device of claim 10, wherein the processor further selects the registered templates which satisfy the angle information according to the angle information and removes a first overlapped area between the verification fingerprint data and the registered template which corresponds to the highest comparison score.

13. The fingerprint matching device of claim 12, wherein the processor further re-calculates the comparison scores after removing the first overlapped area, and selects the registered template which corresponds to the largest overlapped area in the remaining area of the verification fingerprint data, and removes a second overlapped area between the remaining area of the verification fingerprint data and the registered template which corresponds to the largest overlapped area in the remaining area of the verification fingerprint data, and re-calculates the comparison scores after removing the second overlapped area, and does not generate the comparison result according to the comparison scores corresponding to all of the selected registered templates until all of registered templates which overlap the verification fingerprint data are selected.

14. The fingerprint matching device of claim 12, wherein the processor further re-calculates the comparison scores after removing the first overlapped area, and selects the registered template which corresponds to the highest comparison score in the remaining area of the verification fingerprint data, and removes a second overlapped area between the remaining area of the to-be-recognized data and the registered template which corresponds to the highest comparison score in the remaining area of the verification fingerprint data, and re-calculates the comparison scores after removing the second overlapped area, and does not generate the comparison result according to the comparison scores corresponding to all of the selected registered templates until all of registered templates which overlap the verification fingerprint data are selected.

15. The fingerprint matching device of claim 10, wherein the processor further determines whether the comparison result is higher than a first threshold, wherein the processor determines the verification fingerprint data is verified if the comparison result is higher than the first threshold, and the processor determines the verification fingerprint data fails the verification if the comparison result is lower than the first threshold.

16. The fingerprint matching device of claim 10, wherein when the verification fingerprint data and a first registered template of the registered templates do not have a first relative location information, the processor further generates the first relative location information according to a second relative location information between the verification fingerprint data and a second registered template and a third relative location information between the first registered template and the second registered template.

17. The fingerprint matching device of claim 10, wherein the processor generates the comparison scores according to ridge information and/or minutia information.

18. The fingerprint matching device of claim 10, wherein the verification fingerprint data and registered templates are generated by swiping over or pressing one's finger on the fingerprint sensor.

* * * * *